United States Patent

Schrenk et al.

[11] 3,716,612
[45] Feb. 13, 1973

[54] METHOD FOR THE FORMATION OF COMPOSITE PLASTIC BODIES

[75] Inventors: Walter J. Schrenk, Bay City; Kenneth J. Cleereman, Midland; Douglas S. Chisholm, Midland; Turner Alfrey, Jr., Midland, all of Mich.

[73] Assignee: The Dow Chemical Company, Midland, Mich.

[22] Filed: Jan. 6, 1970

[21] Appl. No.: 987

Related U.S. Application Data

[63] Continuation-in-part of Ser. No. 636,480, May 5, 1967, abandoned.

[52] U.S. Cl. ............264/241, 264/173, 264/312, 264/329, 425/131
[51] Int. Cl.............B29f 1/12, B29f 3/10, B29f 3/12
[58] Field of Search ..264/310, 312, 209, 210 R, 171, 264/173, 328, 329, 241, 245; 18/14 R; 425/131, 133

[56] References Cited

UNITED STATES PATENTS

| 3,339,240 | 9/1967 | Corbett | 264/329 |
| 3,565,985 | 2/1971 | Schrenk et al. | 264/171 |
| 3,520,966 | 7/1970 | Soffiantini | 264/173 |
| 2,418,856 | 4/1947 | Stacy | 264/77 |
| 3,281,897 | 11/1966 | Mercer | 264/209 |
| 3,223,761 | 12/1965 | Raley | 264/95 |
| 3,409,709 | 11/1968 | Cleereman et al. | 264/40 |
| 3,488,747 | 1/1970 | Cleereman | 264/122 |
| 3,349,437 | 10/1967 | Quackenbush | 18/14 |

*Primary Examiner*—Robert F. White
*Assistant Examiner*—Jeffery R. Thurlow
*Attorney*—Griswold and Burdick, Richard G. Waterman and Robert B. Ingraham

[57] ABSTRACT

A method is described for making articles of plastic materials; for example, plastic bottles, from a composite of synthetic thermoplastics. Two or more such resinous materials, which have distinct polymeric and physical characteristics, are combined in a way such that they are present in the article in separate phases possessing an apparent plurality of generally commensurately and spirally extending layers of the said resinous materials and in a manner adapted to take full advantage of the resulting combination of properties.

8 Claims, 13 Drawing Figures

PATENTED FEB 13 1973 3,716,612

INVENTORS.
Walter J. Schrenk
Kenneth J. Cleereman
Douglas S. Chisholm
Turner Alfrey, Jr.

BY Robert B. Ingraham
AGENT

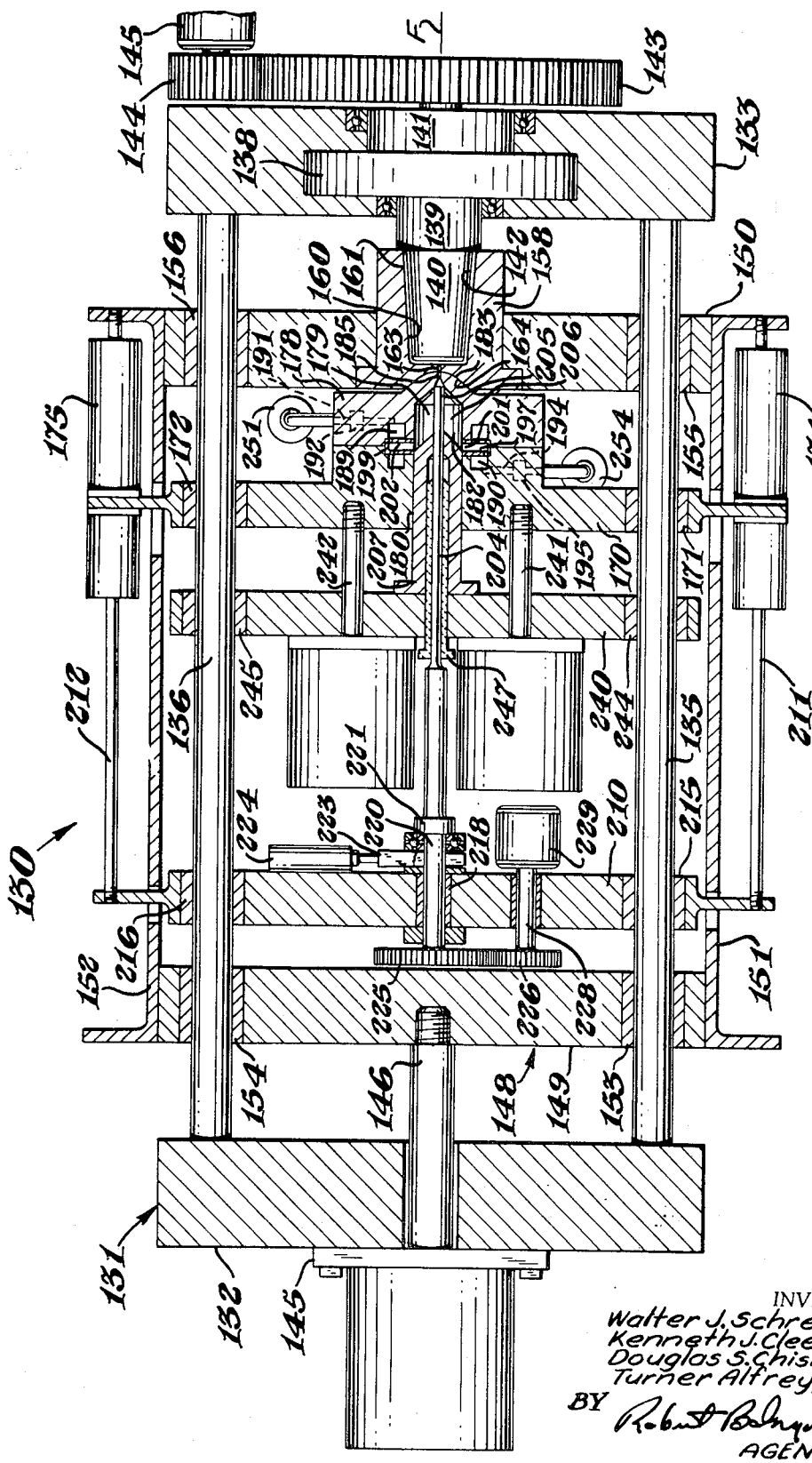

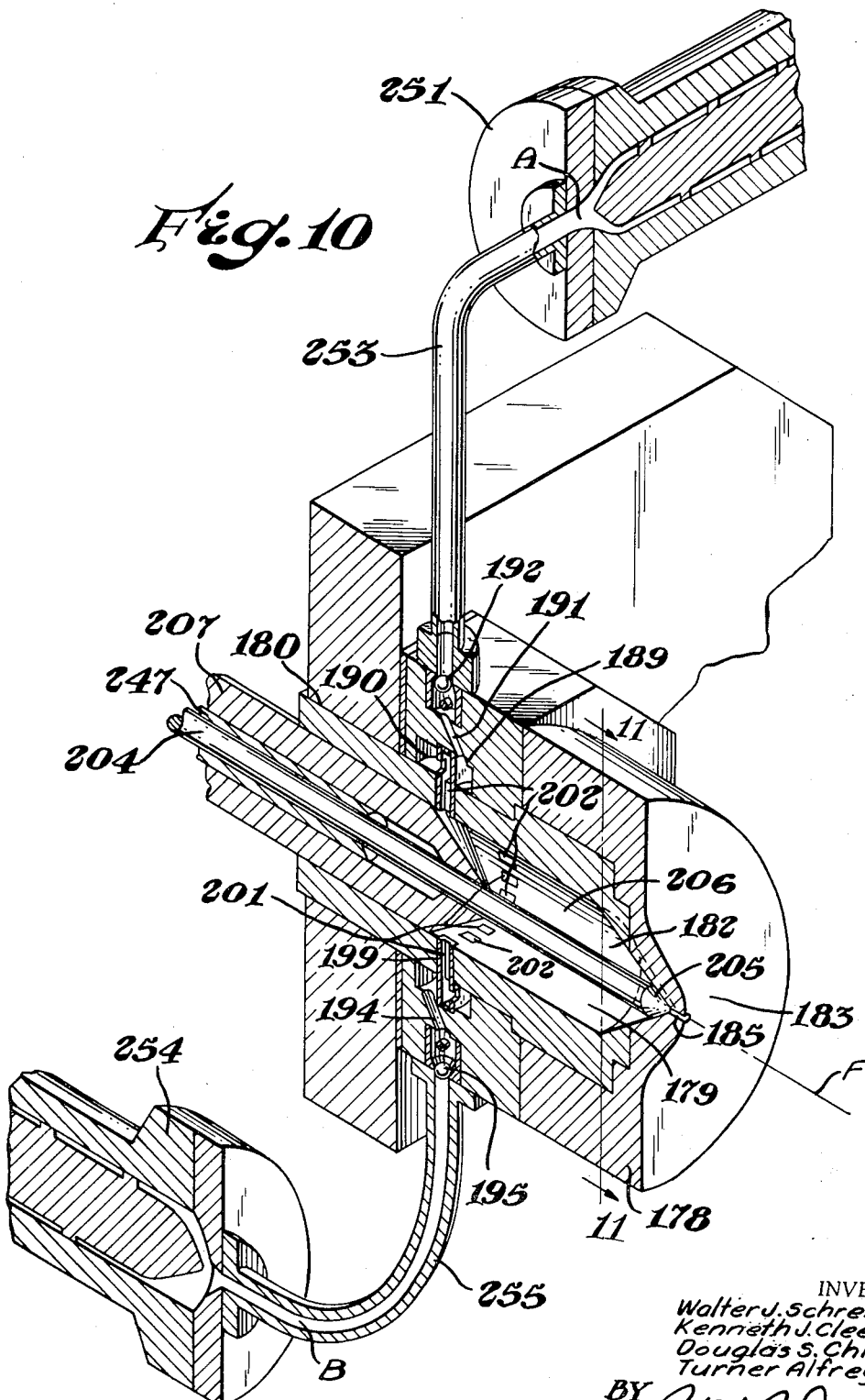

METHOD FOR THE FORMATION OF COMPOSITE PLASTIC BODIES

This application is a continuation-in-part of our copending application Ser. No. 636,480, filed May 5, 1967, now abandoned.

This invention relates to a method and apparatus for fabricating synthetic resinous articles and to articles formed thereby, and more particularly relates to a method and apparatus for heat fabricating articles having two or more diverse synthetic resinous materials present therein in distinct and separate phases.

Synthetic resinous materials, particularly thermoplastic, are readily heat fabricated by such techniques as extrusion and injection molding to rapidly provide desired articles of commerce. Oftentimes, the physical properties of a material which can be heat fabricated are not the desired physical properties of the article which is prepared. For example, polystyrene is easily extruded and injection molded to form desirable articles. However, polystyrene oftentimes is too brittle or subject to chemical attack for desired use. A material such as polyethylene may have desired chemical resistance and toughness but is unsuitable for the desired application because it does not have the tensile strength or rigidity. Numerous attempts have been made to overcome the undesired characteristics of a single material by incorporating other materials which have a reinforcing value such as glass fiber or by lamination within a mold or by the simultaneous extrusion of three or four layers of material having varying properties such as the multilayer coatings on wire cable or pipe.

It would be desirable if there were available a method and apparatus for the production of unique synthetic resinous thermoplastic articles having distinct and separate phases of diverse resinous materials wherein there materials are disposed in apparently a plurality of thin layers.

It would also be desirable if there were available a method and apparatus which was capable of controlling the number of layers of diverse synthetic resinous materials.

These benefits and other advantages in accordance with the method of the present invention are achieved by providing streams of at least a first and a second heat plastified diverse synthetic resinous material, positioning the streams longitudinally within an annular configuration, the annular configuration having an inner wall and an outer wall, rotating the inner wall with respect to the outer wall to apply shear to a composite stream formed of the first and second streams, providing sufficient rotation to form an apparent plurality of layers of the diverse synthetic resinous materials, forming the layered stream into a desired configuration and cooling the layered stream below its heat plastifying temperature.

Also contemplated within the scope of the present invention is an apparatus for the practice of the method of the invention, the apparatus of the invention comprising means to provide at least a first synthetic resinous heat plastified stream, means to provide a second heat plastified synthetic resinous stream, a housing, the housing defining a first passage and a second passage, each of the passages having an inlet end and an outlet end, the inlet end of the first passage being in communication with the means to supply the first stream, the first end of the second passage being in communication with the means to supply the second thermoplastic stream, the second end of the first and second conduits discharging into a common passage defined by the housing, the first and second ends of the first and second passages being adapted to discharge into the common passage in such a manner that a substantial portion of both streams is deposited in a location generally adjacent walls defining the common passage, a mandrel disposed within the common passage having an external wall which, in combination with the housing, defines an annular space within the common passage, means to rotate the mandrel relative to the housing, an outlet passage in communication with the common passage adapted to receive heat plastified synthetic resinous material from the passage, means to receive a stream of heat plastified synthetic resinous material from the discharge passage and to shape the stream into a desired configuration.

Also contemplated within the scope of the present invention is a fabricated shaped article comprising a plurality of layers of diverse synthetic resinous material, a major portion of such layers being less than 10 microns in thickness and the surfaces of the article comprising generally one of the resinous materials.

The method of the present invention is readily practiced utilizing any synthetic resinous material which can be heat plastified to form a viscous melt and be subsequently formed into an article of desired configuration. The method and article of the present invention require that at least two such materials be present and in such cases it is essential that the diverse synthetic resinous materials adhere to each other. Preferably, it is in all cases essential that the adhesion be strong, but generally it is extremely desirable if the diverse materials adhere to each other sufficiently that a peel strength of 3 pounds per inch of width is obtained. Beneficially, in cases where it is desirable to employ two diverse materials which do not adhere to each other to the required degree, a third material may be disposed between the two materials to provide adhesion therebetween. For example, if desired materials are polystyrene and polymethyl methacrylate, a layer of a polymer of about 71 parts ethylene and 29 parts vinylacetate disposed between the polymethyl methacrylate and polystyrene provides excellent adhesion.

Typical beneficial and advantageous combinations of diverse polymers for the practice of the method of the invention are: polystyrene-polyethylene; styrene--acrylonitrile copolymer with vinylidene chloride-vinyl chloride copolymer; polystyrene-styrene butadiene copolymer; polystyrene-ethylene vinyl acetate copolymer; vinylidene chloride-vinyl chloride copolymer with ethylene-vinylacetate copolymer; polyvinyl chloride and a copolymer of vinyl chloride and di-2-ethylhexyl acrylate; polymethyl methacrylate and polyvinyl chloride; acrylonitrile-butadiene--styrene copolymer; vinylidene chloride; di-2-ethylhexyl acrylate copolymer and the like.

More diverse synthetic resinous compositions are styrene-acrylonitrile copolymer, ethylene acrylic acid copolymers and ethylene-ethylene vinyl acetate copolymer; a copolymer of vinylidene chloride-vinyl chloride and di-2-ethylhexyl acrylate, polymethyl methacrylate and polyvinyl chloride; and a copolymer of vinyl chloride and di-2-ethylhexyl acrylate, acrylonitrile-ibutadiene-styrene polymer and vinylidene chloride-2--ethylhexyl acrylate copolymer.

In the practice of the method and operation of the apparatus of the present invention, the synthetic resinous thermoplastic materials are heated to temperatures generally approximating their normal extrusion or molding temperatures. In instances where one material is encapsulated within another, the optimum temperature of the external material is the temperature employed. However, care must be exercised utilizing materials which are thermally degradable in that they are not heated to a temperature sufficient to cause undesired chemical decomposition to adversely discolor the product or to generate gas such as hydrogen chloride which results from the decomposition of chlorinated polymers such as polyvinyl chloride and sarans.

Further features and advantages of the present invention will become more apparent from the following specification when taken in connection with the drawing wherein:

FIG. 1 there is an exploded sectional schematic representation of a tube extruder in accordance with the invention.

FIG. 1A is a modification of the apparatus of FIG. 1.

FIGS. 2, 3, 4 and 5 are sectional views of the extrude and confining walls taken along the lines 2–2, 3–3, 4–4 and 5–5, respectively.

FIG. 9 is a schematic sectional representation of injection molding apparatus in accordance with the invention.

FIG. 10 is a schematic cutaway view of the apparatus of FIG. 9 depicting the injection cylinder and closely associated components.

Figure 1:
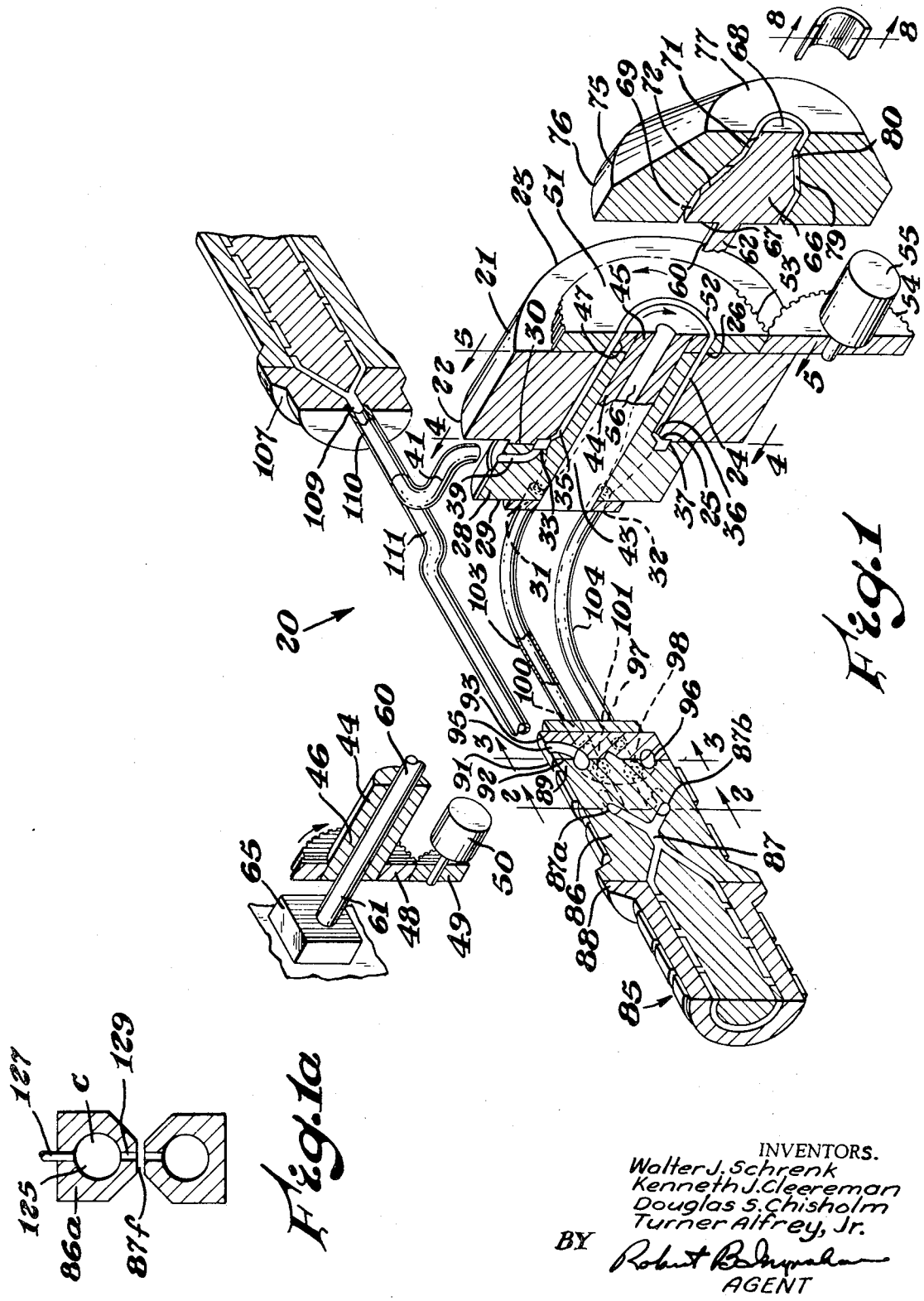

In FIG. 1 there is depicted a schematic exploded cutaway view of extrusion apparatus generally designated by the reference numeral 20. The apparatus 20 comprises in cooperative combination a housing 21. The housing 21 has a first end 22 and a second end 23. The housing 21 defines a generally cylindrical centrally disposed cavity 24. The cavity 24 is a passage having a first end 25 and a second end 26 providing communication between the first end 22 and the second end 23 of the housing 21. Rigidly affixed to the housing 21 is a distributor housing 28. The distributor housing 28 has a first end 29 and a second end 30. The housing 28 defines four first polymer inlet passages 31, 32 and two more symmetrically disposed and not shown. The distributor housing 28 defines an inwardly disposed annular plenum 33, the annular plenum 33 being disposed adjacent the second end 30 of the housing 28, the annular plenum 33 having four major discharge openings 35, 36 and two more symmetrically disposed and not shown. The discharge openings 35 and 36 and the symmetrically disposed openings not shown are defined by means of a distributor block 37. A second polymer supply passage 39 is disposed within the distributor housing and is in communication with the annular plenum 33 and a polymer or extrude source 41. he polymer inlet passages 31 and 32 and two symmetrically disposed and not shown have a generally circular configuration adjacent the first end 29 of the distributor housing 28 and a flattened arcuate configuration generally adjacent the discharge openings 35, 36 and the two discharge openings not shown. The distributor housing 28 defines a generally hollow cylindrical passageway 43 extending from the first end to the second end of the distributor housing 28. Disposed within the passageway 43 is a rotatable sleeve 44. The sleeve 44 has a first end 45 and a second end 46. The first end 45 is external to the housing 21 and generally adjacent the second end 23 of the housing 21 and external to the distributor housing 28. The sleeve 44 defines an external generally cylindrical surface 47 adjacent the second end 23 of the housing 21 which is generally coaxial with the terminal portions of the discharge openings 35, 36 and two discharge openings not shown. The second end 46 of the sleeve 44 has affixed thereto a rotating means 48 which is in operative combination with a pinion gear 49 which in turn is rotated by a motor 50. Rotation of the sleeve 44 is indicated by the arrow. The sleeve 44 is rotatably journaled within the distributor housing 28. Adjacent the second end 23 of the housing 21 is a rotating element 51. The rotating element 51 defines a generally cylindrical internal surface 52 generally coextensive with the outlet portions of the discharge openings 35, 36 and two more not shown coextensive in length with the axial length of the surface 47 of the sleeve 44. The rotating element 51 is of generally annular configuration and has a plurality of gear teeth 53 disposed on the outer surface thereof. The gear teeth 53 are in mating engagement with a pinion gear 54 which in turn is rotated by a motor or rotating means 55. The direction of rotation of the rotating element 51 is indicated by the arrow. The sleeve 44 and rotating element 51 rotate in opposite directions. The rotating element 51 is journaled by means not shown. A cylindrical passageway 56 is centrally disposed within the rotating sleeve 44. A stationary mandrel or shaft 60 is disposed within the passageway 56 and extends through the sleeve 44, the housings 21 and 28. The mandrel shaft 60 has a first end 61 and a second end 62, the first end 61 is secured to a rigid frame or support 65. A mandrel 66 is rigidly secured to the second end 62 of the mandrel shaft 60. The mandrel 66 has a first end 67 and a second or terminal end 68 generally perpendicular to the axis of the mandrel shaft 60. The first end 67 of the mandrel 66 is circular in cross-section and corresponds in dimension to the first end 45 of the sleeve 44. Adjacent the first end 67 of the mandrel 66 is a cylindrical external surface 69 corresponding in diameter to the surface 47 of the sleeve 44. Adjacent the second end 68 of the mandrel 66 is a second cylindrical surface 71. Adjacent portions of the surfaces 69 and 71 are joined by a frustoconical surface 72 defined by the mandrel 66. An external die ring 75 having a first end 76 and a second end 77 is disposed adjacent the rotating element 51. The die ring 75 is rigidly affixed relative to the housing 21 by means not shown and defines an internal passageway 79 generally corresponding in shape to the external surfaces 69, 71 and 72 of the mandrel 66. The die ring 75 and the mandrel 66 define therebetween a tapering annular extrusion passageway 80. In operative association with the distributor housing 28 is a first extruder 85. The extruder or source of heat plastified synthetic resinous material terminates in a first extruder distributor block 86. The first extruder distributor block 86 defines an internal cylindrical passageway 87 adapted to receive synthetic resinous material from the source or extruder 85. The extruder block 86 has a first end 88 and a second or discharge end 89. The passageway 87 adjacent the first end 88 is of cylindrical configuration. Generally adjacent the second end 89 the passageway 87 forms four branches 87a, 87b and two branches not shown. An encapsulation block 91 having a first end 92 and a second end 93 is disposed in sealing relationship with the second end 89 of the block 86. The encapsulation block 91 defines a polymer receiving passageway 95 and an internal generally discoidal plenum 96. The polymer receiving passageway 95 in cooperative combination with the second end 89 of the block 86 defines four generally annular inwardly extruding apertures 97, 98 and two apertures not shown. The apertures 97 and 98 surround the passageways 87a, 87b, respectively, and the passageways not shown. The block 91 defines four internal passageways 100, 101 and two passageways not shown corresponding to the four branches of the passageway 87, branches 87a and 87b shown. The passageways 100 and 101 are in operative communication with first and second conduits 103 and 104 which provide communication between the passageways 100 and 101 and the first polymer inlet passageways 31 and 32 of the distributor housing 28. A second extruder 107 is in operative combination with the encapsulation block 91 and distributor housing 28. The extruder 107 terminates in a discharge passageway 109. The passageway 109 is in communication with a second polymer supply means or conduit 110. The conduit 110 is in operative communication with the conduit 41 and a second conduit 111. The conduit 111 is in operative communication with the passageway 95 of the encapsulation block 91.

In FIG. 1A there is schematically depicted a modification of the apparatus of FIG. 1 wherein an extrusion block 86a having an extrusion passage 87f (corresponding to 87a, 87b, etc. of FIG. 1) defines an internal annular plenum 125. A passageway 127 is in operative communication with a source of synthetic resinous material C not shown. The block 86a defines an annular extrusion passageway 129 communicating between the passageway 87f and the plenum 125. By utilizing the modification of FIG. 1A, a third synthetic resinous component C is readily introduced which encapsulates each of the streams 87 prior to entering the encapsulation block 91. Such a modification is particularly beneficial if the adhesion between components A and B is inadequate. The component C beneficially is a quantity of material which adheres the components A and B together.

Figure 2:
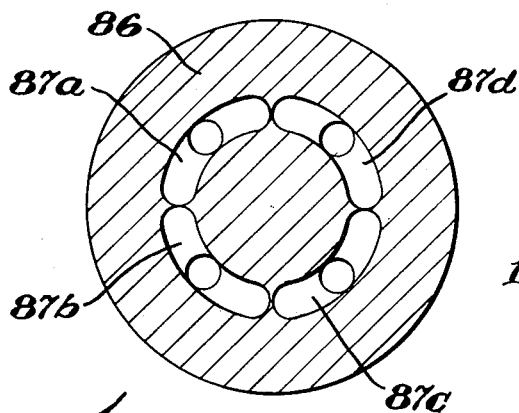

In FIG. 2 there is a sectional view of the block 86 taken along the line 2-2 showing the location of passageways 87a, 87b and the passageways 87c and 87d, the latter two not shown in FIG. 1.

Figure 3:
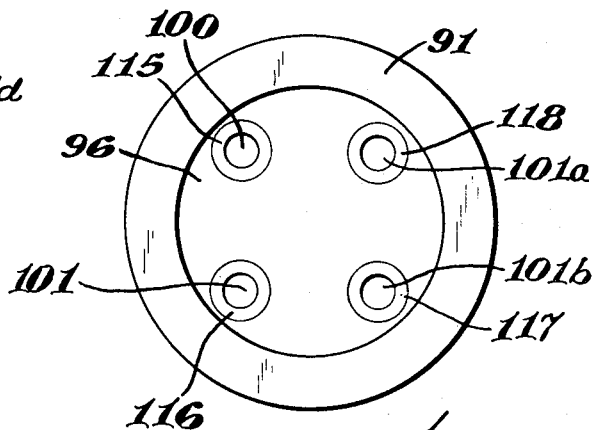

In FIG. 3 there is depicted a view taken through the encapsulation block 91 along the line 3—3 of FIG. 1 wherein the plenum 96 and faces 115, 116, 117 and 118 serve to define the four inwardly extruding annular passageways 97, 98 (corresponding to faces 115 and 116, and two passageways 101a and 101b not shown in FIG. 1).

Figure 4:
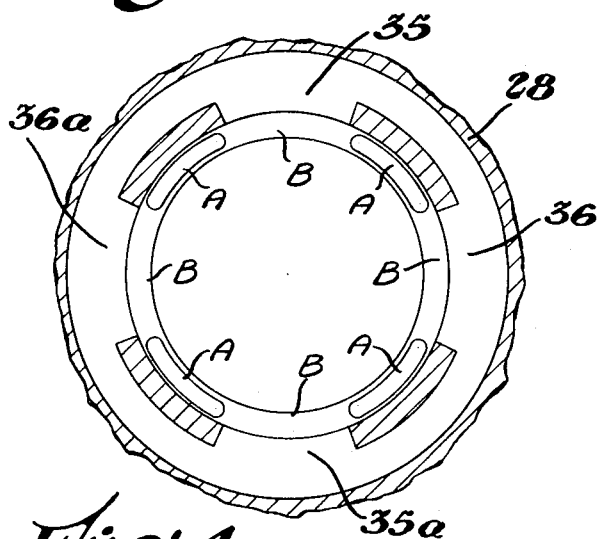

In FIG. 4 there is depicted a fractional view of the distributor housing 28 taken along the line 4—4 of FIG. 1. The housing 28 defines discharge passages 35, 36, 35a and 36a. The passages 35a and 36a are not shown in FIG. 1. The reference character A depicts polymer from the extruder 85 and B indicates polymer from the extruder 107.

Figure 5:
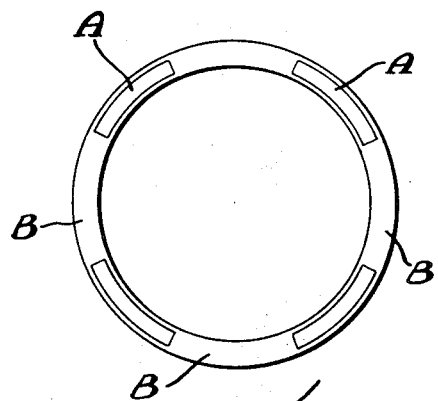

In FIG. 5 there is shown the configuration of the extrude taken along the line 5—5 of FIG. 1 wherein polymer from the first extruder 85 is designated as A and polymer from the second extruder 107 is designated as B.

Figure 6:
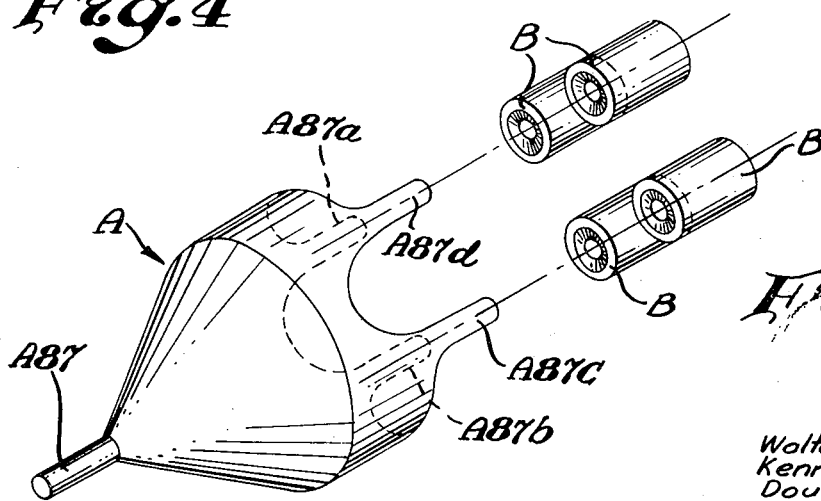
FIG. 6 is an exploded view of the configuration of the extrude in the region of the line 2–2.

In FIG. 6 there is illustrated an isometric exploded view of frozen or solid polymers A and B taken from the feed block 86 in order to depict the configuration of the cavity therein. The portion of the material from the passageway 87 is designated as A87 and the portions from the passageways 87a, 87b, 87c and 87d are designated as A87a, A87b, A87c and A87d. Thus, as can be seen from FIG. 6, the passageway 87 branches into four symmetrical substreams. The configuration of frozen polymer designated as B depicts the configuration of the plenum 96. The center lines indicate the relationship between the polymer A and the polymer B in unexploded form.

Figure 7:
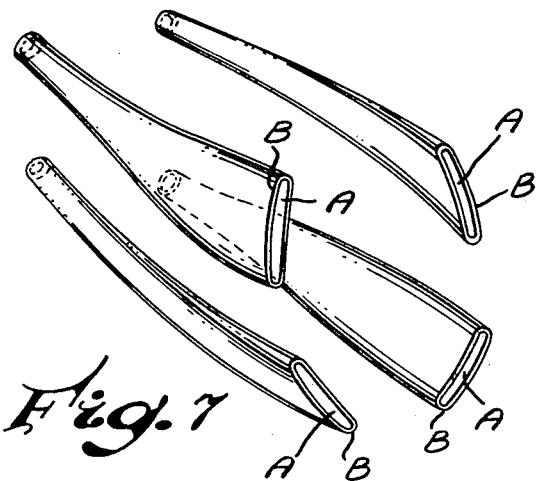
FIG. 7 is an isometric representation of the extrude in the region of the line 4–4.

In FIG. 7 there is depicted an isometric representation of frozen polymer from the distributor 28 wherein the stream is shown divided into four segments symmetrically disposed about a center line, each of the segments comprising an inner layer or core of polymer A and an outer layer of the polymer B. The cylindrical portion of the segments is adjacent the first end 29 of the distributor housing 28 and the arcuate portions form a relationship generally adjacent the plenum 33.

Figure 8:
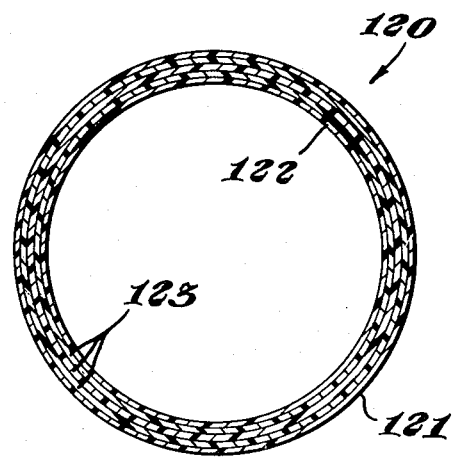
FIG. 8 is a schematic sectional representation of the extrude along the line 8–8.

In FIG. 8 there is schematically illustrated a sectional view of a product generally designated by the reference numeral 120. The product 120 is a generally hollow cylindrical body having an external face 121 of polymer B and an internal face 122 of polymer B and a plurality of internally generally spirally disposed layers 123 composed of polymer A. For ease of illustration, the layers are shown as circularly disposed rather than spirally disposed.

In operation of the apparatus 20 of FIG. 1, a heat plastified stream of a first synthetic resinous material is supplied by the extruder 85 to the distributor block 86. The heat plastified thermoplastic material from the extruder 86 is split into four separate streams corresponding to the passageways 87a, 87b, 87c and 87d. The configuration of this stream is designated as A in FIG. 6. A second synthetic resinous material is supplied from the extruder 107 and discharged from the passageway 109 into the conduit 110. A minor portion of the stream from the extruder 107 is passed into the conduit 111 and subsequently into the encapsulation block 91. The plastic material from the second extruder generally designated by the reference numeral B is passed into the plenum 96 whereupon it assumes the configuration depicted in FIG. 6 and designated as B. The polymer B passes through annular inwardly extruding apertures such as the apertures 97 and 98 to encapsulate the four branches of the stream 87. Each of the four branches 87 is conveyed to a distributor housing through separate conduits such as the conduits 103 and 104. The configuration of the polymer within the conduits such as the conduits 103 and 104 comprises a central core of the material A encapsulated by the material B. On entering the distributor block 28 and the first polymer passageway such as the passageways 31 and 32, the four separate streams are deformed into a configuration such as is illustrated in FIG. 7.

In FIG. 7 wherein the entrance end of the composite stream has a generally cylindrical configuration and the portion of the stream adjacent the first end 22 of the housing 21 has an arcuate configuration, each of the streams lying generally on a circle having a common center. A major portion of the polymer B from the extruder 107 passes into the conduit 41 and into the passageway 39 of the distributor housing 28. From the passageway 39 the polymer enters the annular plenum 33 and is distributed annularly about the deformed segments depicted in FIG. 7. The discharge openings such as the openings 35 and 36, plus two discharge openings not shown, deposit polymer B between the segments shown in FIG. 7 to provide an annular stream having the configuration depicted in FIG. 5. The composite stream in the annular cavity 24 adjacent the second end 23 of the housing 21 has the segmented configuration of FIG. 5. The sleeve 44 is rotating in the direction indicated by the arrow and the rotating element 51 is rotating in an opposite direction. Because of the viscous characteristics of the composite streams, the portion of the stream adjacent the inner surface 52 of the rotating element 51 is displaced in a generally circumferential manner and the portion of the stream adjacent the surface 46 of the first end 45 is displaced in the opposite direction. Thus, in the case where no axial flow occurs, the portions A of the polymer are wound in effect about the surface 46, producing a number of spirally disposed layers until one reaches the limiting condition where in the layers reach molecular dimensions and a homogeneous mixture results. However, in practice of the present invention, it is desired to produce a structure having finite layers of greater than molecular dimension of component A encapsulated within component B. Therefore, the rate of extrusion of the composite stream in the annular space 24 defined between the housing 21 and the distributor housing 28 and the rate of rotation of the inner sleeve and the outer rotating element are adjusted to provide the desired layered configuration. The composite stream on passing toward the stationary mandrel 66 and the die are subsequently deformed to provide the desired tubular configuration or alternately they may be extruded in the form of a rod or other desired elongate cross-sectional configuration. Beneficially, the composite tube is molecularly oriented as shown in U.S. Pat. No. 3,279,501. Thus, maximum desired physical properties are achieved by balancing the content of component A against the content of component B and the desired layer configuration achieved by adjusting the extrusion and rotation rate to provide the desired final product.

FIG. 9 is a schematic representation of an injection molding apparatus in accordance with the present invention and is generally designated by the reference numeral 130. The apparatus 130 comprises in cooperative combination a fixed or stationary frame 131. The frame 131 comprises a first end portion 132 and a second end portion 133. The first and second end portions 132 and 133 are maintained in fixed relationship to each other by means of a plurality of generally parallel elongate elements 135 and 136. The elements 135 and 136 are adapted for the slidable support of a plurality of elements. The second end 133 of the frame 131 has rotatably journaled therein a spindle 138. The spindle 138 comprises a body portion 139, a cavity defining portion 140 and a driving portion 141. The spindle 138 is rotationally symmetrical about the axis F. The driving means 141 is in operative communication with a spindle rotating means or gear 143. The gear 143 is in operative engagement with a pinion gear 144 which in turn is driven by a motor 145. The mold defining portion 140 of the spindle 138 has an external surface 142 having the configuration of an internal portion of a cup. The first end 132 of the frame 131 has rigidly affixed thereto a linear actuator 145. The linear actuator 145 beneficially is a hydraulic cylinder having an actuating arm 146 adapted to move along the axis F. The actuator or piston rod 146 is secured to a first sliding frame 148. The first sliding frame 148 comprises a first end member 149 and a second end member 150 and side frame portions 151 and 152. The first end 149 is slidably supported on the frame members 135 and 136 by means of the journals or bushings 153 and 154, respectively. The second end 150 is slidably supported on the members 135 and 136 by means of the journals or bushings 155 and 156, respectively. Thus, the first sliding frame 148 is positioned longitudinally along the axis F by means of the actuating member 146. The second end 150 of the frame 148 has rigidly disposed therein a mold member 158. The mold member 158 defines an internal cavity 160. The cavity 160 is adapted to cooperate with the external surface 142 of the cavity defining portion 140 to define a cup-shaped cavity 161 therebetween. The mold 158 has a sprue or entrance port 163 disposed generally toward the first end 149 and remote from the spindle 138. The port 163 is generally axially disposed with respect to the axis F. The mold 158 adjacent the port 163 and remote from the cavity 161 defines a nozzle engaging and sealing surface 164. The first sliding frame 148 supports a second sliding frame 170. The sliding frame 170 is journaled to the elongate members 135 and 136 by means of the bearings 171 and 172, respectively. The second sliding frame 170 is adjustably affixed to the first sliding frame 148 by means of the hydraulic cylinders or linear actuators 174 and 175, respectively. The actuators 174 and 175 are adapted to position the second sliding frame relative to the first sliding frame in a direction parallel to the axis F. The second frame 170 supports rigidly a feed and distributor housing 178. The feed and distributor housing 178 is rigidly secured to the frame 170 and defines an internal annular cavity 179. The internal annular cavity 179 is generally symmetrically disposed about the axis F. The cavity 179 has a first end 180 and a second end 182. The cavity 179 terminates adjacent the second end 182 in an injection nozzle 183 having a centrally disposed passageway 185 adapted to be in communication with the passageway 163 of the mold 158. The nozzle 183 is adapted to mate with the surface 164 in sealing relationship when the housing 178 is adjacent thereto. The housing 178 defines a first internal annular plenum 189 generally coaxially disposed about the passage 179. A generally similar plenum 190 is disposed generally adjacent the first annular plenum 189. The plenum 189 is in communication with a first polymer supply passageway 191. Within the passageway 191 is disposed a check valve generally designated by the reference numeral 192 adapted to prevent flow of polymeric material from the annular passageway or plenum 189 into the passageway 191. The annular plenum 190 is in communication with a passageway 194. A check valve 195 disposed in the passageway 194 prevents flow of material from the annular plenum 190 into the passageway 194. A polymeric material A is adapted to enter the passageway 191. The polymeric material B is adapted to enter the passageway 194. The housing 178 defines an annular passageway 197 communicating between the passage way 179 and the annular plenums 189 and 190. Within the passageway 197 is disposed a feed or distributor block 199. The distributor block 199 has defined therein a first plurality of generally radiating slots 201 and a second interdigitating plurality of radiating slots 202, the slots 201 and 202 being in alternate radial arrangement to provide a plurality of alternate streams of material from the plenums 189 and 190 to the internal passageway 179. A rotating mandrel 204 is centrally positioned within the passageway 179 and is rotatable about the axis F. The mandrel 204 has a first or valving end 205. The housing 178 and the mandrel 204 define a generally annular space 206 disposed within the passageway 179. An injection ram or plunger 207 is disposed within a first end 180 of the passageway 179 and is adapted to be slidably positioned therein. A third sliding frame 210 is slidably positioned relative to the second sliding frame 170. The sliding frame 210 is connected to the second sliding frame 170 by means of linear actuators 211 and 212. The linear actuators 211 and 212 are adapted to move the third sliding frame 210 in a direction along the axis F relative to the second sliding frame 170. The third sliding frame 210 is slidably supported on the members 135 and 136 by means of the bearings 215 and 216, respectively. The third sliding frame 210 rotatably supports the mandrel 204 by means of the bearing assembly 218. The mandrel 204 has a second end 220 supported by the bearing 218. A shoulder 221 is disposed on the second end 220 of the mandrel 204. The shoulder 221 is in operative engagement with a mandrel axial positioning means 223 adapted to permit limited positioning of the mandrel 204 relative to the sliding frame 210 by means of the linear actuator 224. Beneficially, positioning is accomplished by means of a wedging device against the shoulder 221. A mandrel rotating means 225 is rigidly affixed to the second end 220 of the mandrel 204. The rotating means 225 beneficially is a spur gear in operative engagement with a pinion gear 226 mounted on a shaft 228 which is in turn driven by a motor 229 fixed relative to the frame 210 by means not shown. A fourth sliding frame 240 is affixed to the second sliding frame 170. The sliding frame 240 is slidably affixed to the second frame 170 by means of linear actuators 241 and 242. The linear actuators 241 and 242 permit positioning of the fourth sliding frame relative to the second sliding frame as desired. The fourth sliding frame 240 is slidably affixed to the members 135 and 136 by means of the journals or bushings 244 and 245. Centrally disposed within the frame 240 is a bushing or seal 247. The bushing or seal 247 engages the mandrel 204 in sealing relationship and the plunger 207 also in sealing relationship. The plunger 207 is rigidly affixed to the frame 240. The passageway 191 is in operative communication with a first polymer source or extruder 251 while the passageway 194 is in operative communication with a second polymer source 254.

In FIG. 10 there is depicted a schematic detailed view of the injection portion of the apparatus of FIG. 9 depicting the relationship of the housing 178, the internal generally annular cavity or space 206, the mandrel 204, the bushings 247 and the relationship of the plenums 189, 190 and their respective discharge slots 201 and 202. The mandrel 204 is shown in sealing engagement with the housing 178 preventing flow of fluid from the annular space 206. The check valves 192 and 195 are shown in closed position. A first extruder 251 is shown in operative communication with the passageway 191 by means of a conduit 253. A second extruder 254 is in operative communication with the passageway 194 by means of the conduit 255.

Figure 11:
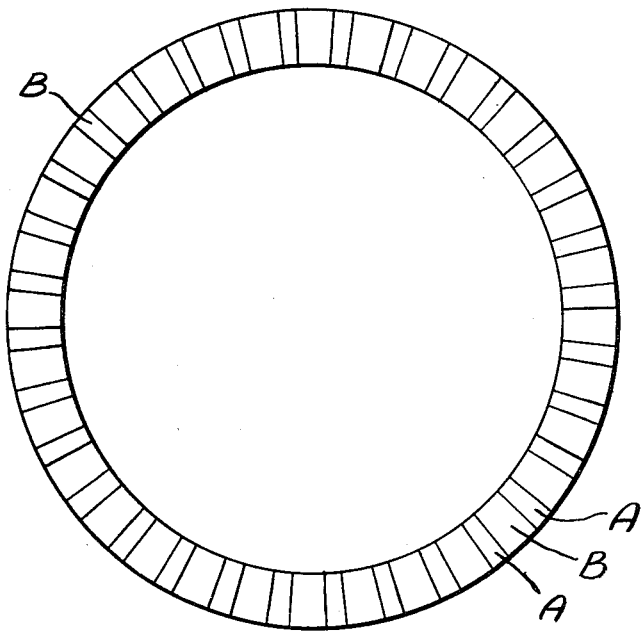
FIG. 11 is a sectional view of the flow pattern along the line 11—11 of FIG. 10.

In FIG. 11 there is shown a schematic sectional view of the configuration of the extrude in the distributor 199 taken along the line 11—11 of FIG. 10. A first polymer A is shown positioned as a plurality of generally radial extending elements disposed between radially extending elements of a polymer B.

Figure 12:
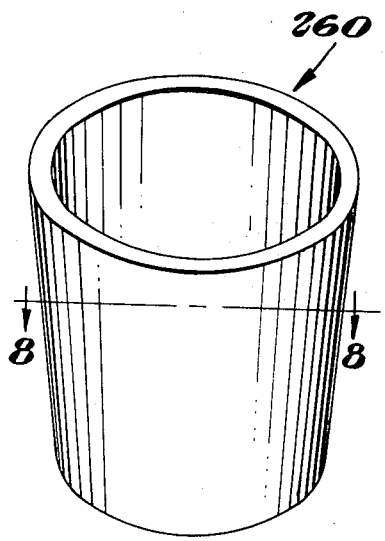
FIG. 12 is a molded article prepared by the apparatus of FIGS. 9 and 10.

FIG. 12 depicts a cup-like article designated by the reference numeral 260 prepared employing the apparatus of FIGS. 9 and 10. A view through the wall of the cup 260 along the line 8—8 can be generally schematically represented by FIG. 8.

In operation of the apparatus as depicted in FIGS. 9 and 10, the mandrel 204 rests against the housing 178 to close the opening 185. Diverse synthetic resinous materials are fed into the annular space 206 from the first extruder 251 and the second extruder 254 to provide a two phase annular polymeric body having the configuration of the chamber 206 and a plurality of generally radially extending elements of a first polymer are in alternating relationship with generally like elements of a second polymer. The mandrel 204 is rotated to an extent sufficient to form a body having generally spirally disposed thin layers of polymer A and polymer B. With the mold closed; that is, with the first and third sliding frames in the position depicted in FIG. 9, the actuator 224 withdraws the mandrel 204 to open the passageway 185. The linear actuators 241 and 242 draw the fourth sliding frame toward the second sliding frame, forcing the annular ram 207 into the cavity 206 and the synthetic resinous material from the cavity 206 into the mold cavity 161, the linear actuator 146 during this process forcing the first sliding frame toward the second end 133. As the synthetic resinous material from the annular cavity 206 is forced into the mold, the spindle 138 is rotated through the gears 143, 144 and the motor 145 in a direction which serves to further wind the spiral layers of the thermoplastic material to provide more convolutions. The rotation of the spindle 138 desirably provides molecular orientation to the article being formed in the cavity. At a predetermined time, determined by the resistance to rotation of the spindle 138, rotation is stopped and the molded part permitted to cool below the thermoplastic temperature. The linear actuator 146 draws the first sliding frame away from the second end 133 of the stationary frame. The part is then ejected from the mold. The linear actuator 146 then positions the first sliding frame adjacent the first end 132 closing the mold formed by the spindle 138 and the mold 158. The linear actuators 211 and 212 beneficially serve to withdraw the mandrel 204 from the passageway 179 until the terminal or end portion of the mandrel 183 is flush with the portion of the ram 207 most remote from the frame 204. At such time, the linear actuators 241 and 242 may draw the fourth frame 240 toward the second frame 170, discharging a major portion of the material within the cavity and subsequently the linear actuators 211 and 212 may force the remainder of the plastic material from the passageway 179.

In practice of the method of the present invention in use of the apparatus, generally it is desirable to employ materials having diverse physical properties.

By way of further illustration, employing apparatus substantially as depicted in FIG. 1, a synthetic resinous thermoplastic tube is prepared employing the following compositions with the following results:

A. A copolymer of 72 weight percent styrene and 28 weight percent acrylonitrile is employed with a copolymer of 85 weight percent vinylidene chloride and 15 weight percent vinyl chloride wherein the vinylidene chloride polymer is embedded within the styrene polymer. Such a combination is particularly beneficial in the manufacture of containers for pharmaceuticals, oxygen-sensitive chemicals and the like. The combination is transparent, rigid and has a very low oxygen transmission rate.

B. Polystyrene is employed to encapsulate a block copolymer of 40 weight percent styrene and 60 weight percent butadiene wherein the thickness of the layers is about 1 micron. The resultant product is transparent, tough and has high impact strength.

C. A tube is prepared having alternating layers of (a) polyethylene, (b) a copolymer of about 86 weight percent ethylene and 14 weight percent vinyl acetate and (c) a copolymer of about 84 weight percent vinylidene chloride, 5 weight percent vinyl chloride and 11 weight percent di-2-ethylhexyl acrylate wherein the outer layers are polyethylene and the inner portions are spiral layers of ethylene vinyl acetate and vinyl chloride resin. This structure provides a body which is particularly suitable for squeeze bottles and has a low oxygen transmission rate and is highly resistant to the transmission of essential oils used in cosmetics.

D. A tube of polymethyl methacrylate encapsulating polyvinyl chloride is prepared which has at least about 20 layers. A container prepared from such a combination is rigid, has high impact strength and is more transparent than a blend of polymethyl methacrylate and polyvinyl chloride.

E. An ABS polymer formed from 20 weight percent acrylonitrile, 70 weight percent styrene and 10 weight percent butadiene rubber in combination with a copolymer of 87 weight percent vinylidene chloride and 13 weight percent 2-ethylhexyl acrylate is formed into a tube having an outer skin of the ABS polymer and an inner skin of the vinylidene chloride polymer and a core consisting of alternating layers of the ABS vinylidene chloride polymer. A container fabricated from this combination has excellent resistance to crazing by natural fats such as butter fat and is excellent for vacuum packaging applications.

Bodies formed from the foregoing combinations employing the apparatus of FIGS. 9 and 10 show similar properties.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of synthetic resinous plastic bodies having distinct and separate phases of diverse resinous materials therein, the steps of the method comprising
   providing streams of at least first and second heat plastified diverse synthetic resinous materials,
   positioning the streams longitudinally within an annular configuration wherein each of the streams is generally radially extending and in contact with adjacent streams, the annular configuration having an inner wall and an outer wall,
   rotating the inner wall relative to the outer wall to apply shear to a composite stream formed of the first and second streams,
   providing sufficient rotation to form an apparent plurality of generally commensurately and spirally extending layers of the diverse synthetic resinous material,
   injecting the layered stream into a mold cavity having a desired configuration and
   cooling the layered molded configuration below its heat plastifying temperature.

2. The method claim 1 wherein the first stream is encapsulated within the second stream to form the composite stream.

3. The method of claim 1 wherein the first stream is divided into a plurality of streams and disposed within the second stream.

4. The method of claim 1 wherein the composite stream is subsequently formed into a generally tubular configuration.

5. The method of claim 1 wherein a third stream of a synthetic resinous material is employed and is disposed between first and second streams, the material of the third stream adhering to the material of the first and second streams below its heat plastifying temperature.

6. The method of claim 2 wherein at least one of the resinous materials is molecularly oriented as it is formed into the desired configuration.

7. The method of claim 2 wherein the layered stream is formed into a generally cup-like configuration.

8. The method of claim 2 wherein the first stream is a generally chemically resistant resinous material.

* * * * *